United States Patent [19]

Moriguchi et al.

[11] 4,447,819
[45] May 8, 1984

[54] THERMAL RECORDING DEVICE

[75] Inventors: Haruhiko Moriguchi; Takashi Ohmori, both of Kanagawa, Japan

[73] Assignee: Fuji Xerox Co., Ltd., Tokyo, Japan

[21] Appl. No.: 386,383

[22] Filed: Jun. 8, 1982

[30] Foreign Application Priority Data

Jun. 8, 1981 [JP] Japan .................................. 56-86764

[51] Int. Cl.³ ............................................ G01D 15/10
[52] U.S. Cl. ................................ 346/76 PH; 400/120
[58] Field of Search ...................... 346/76 PH; 400/120

[56] References Cited

U.S. PATENT DOCUMENTS 4,216,481  8/1980  Hakoyama ....................... 346/76 PH
4,334,231  6/1982  Regehr ............................ 346/76 PH
4,355,319 10/1982  Takeuchi et al. ................ 346/76 PH
4,366,489 12/1982  Yamaguchi ..................... 346/76 PH Primary Examiner—E. A. Goldberg
Assistant Examiner—Derek Jennings
Attorney, Agent, or Firm—Sughrue, Mion, Zinn, Macpeak and Seas

[57] ABSTRACT

A thermal recording device is equipped with counters and an adder for determining the number of record bits applied to the heat generating unit arrays, and the number of blocks to be simultaneously driven is determined according to this value such that the power source capacity is not exceeded. When over a predetermined value, the blocks may be operated successively without overlap rather than simultaneously.

4 Claims, 5 Drawing Figures

THERMAL RECORDING DEVICE

BACKGROUND OF THE INVENTION

This invention relates to a thermal recording device in which data are thermally recorded using at least two thermal heads or heat generating unit arrays.

In some thermal recording devices in which data are recorded in multicolors or with high resolution, data are thermally recorded using at least two thermal heads or heat generating unit arrays.

One example of a two-color recording device of this type is as shown in FIG. 1. The device comprises a first recording section A for recording data in a red recording color and a second recording section B for recording data in a black recording color, for example. The recording sections A and B have thermal heads 1A and 1B, respectively. The thermal head 1A is driven by red image signals. An ink donor sheet 3A coated with a thermal transfer type ink is supplied from a supply roll 2A to the thermal head 1A, so that "red" data are thermally transferred in a red recording color to a recording sheet 4 which runs in the direction of the arrow. A back roll 5A operates to press the recording sheet 4 against the ink donor sheet 3A to facilitate the thermal transfer of the ink and to convey the recording sheet 4. After the thermal transfer operation has been accomplished, the used ink donor sheet 3A is wound on a winding roll 6A.

Similarly, as in the first recording section A, in the second recording section B an ink donor sheet 3 is conveyed from ;a supply roll 2B to a winding roll 6B, and data are thermally recorded in black on the recording sheet, which passes between a thermal head 1B and a back roll 5B. In order to miniaturize the memory for delaying the image signals, for example, the distance between the two recording sections A and B is made as short as possible. Therefore, the recording operations of the two recording sections A and B overlap each other in time.

FIG. 2 shows a thermal head used in a thermal recording device which is high in resolution. Two arrays of heat generating elements 11 and 12 are arranged on the insulated substrate 9 of the thermal head 8 in such a manner that they are in parallel with each other and are shifted by ½ pitch in the "column" direction. The array of heat generating elements 11 is divided into two blocks of heat generating elements by first common electrodes 13A and 13B, and the array of heat generating elements 12 is divided into two blocks of heat generating elements by second common electrodes 14A and 14B. When image signals are supplied to individual drive electrodes 15 and 16, the blocks of heat generating elements are driven separately. Thus, the distribution of image signals for a line of an original to two arrays of heat generating elements 11 and 12 makes it possible to thermally record data with high resolution. In this case also, the recording operations of the two arrays 11 and 12 are overlapped in time.

A thermal recording device in which a plurality of thermal heads or plural arrays of heat generating units (or heat generating elements) are driven simultaneously requires a power source of large capacity. Therefore, such devices are disadvantageous in that their manufacturing cost is high.

SUMMARY OF THE INVENTION

In view of the foregoing, an object of this invention is to provide a thermal recording device in which the capacity of the power source can be reduced.

The foregoing object of the invention has been achieved by the provision of a thermal recording device in which a plurality of thermal heads or heat generating unit arrays are driven separately according to blocks into which the thermal heads or heat generating unit arrays have been divided, with the total number of record bits in the blocks to be driven simultaneously being made smaller than a predetermined value.

DETAILED DESCRIPTION OF THE PREFERRED EMBODIMENTS

Figure 1:
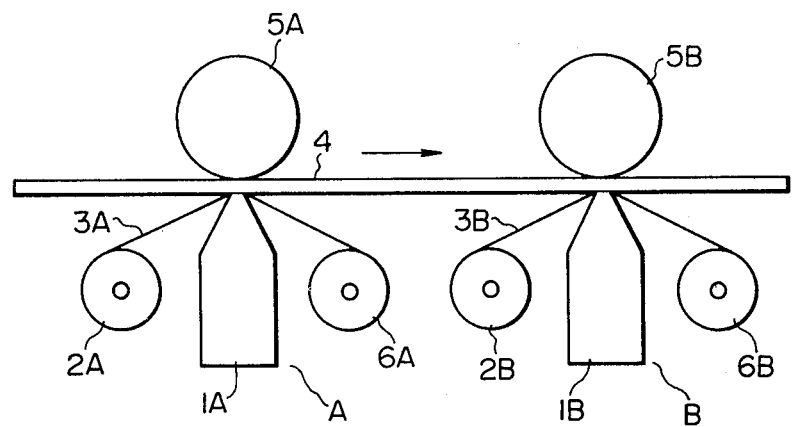
FIG. 1 is an explanatory diagram outlining the arrangement of the recording section of a two-color recording device.
Figure 2:
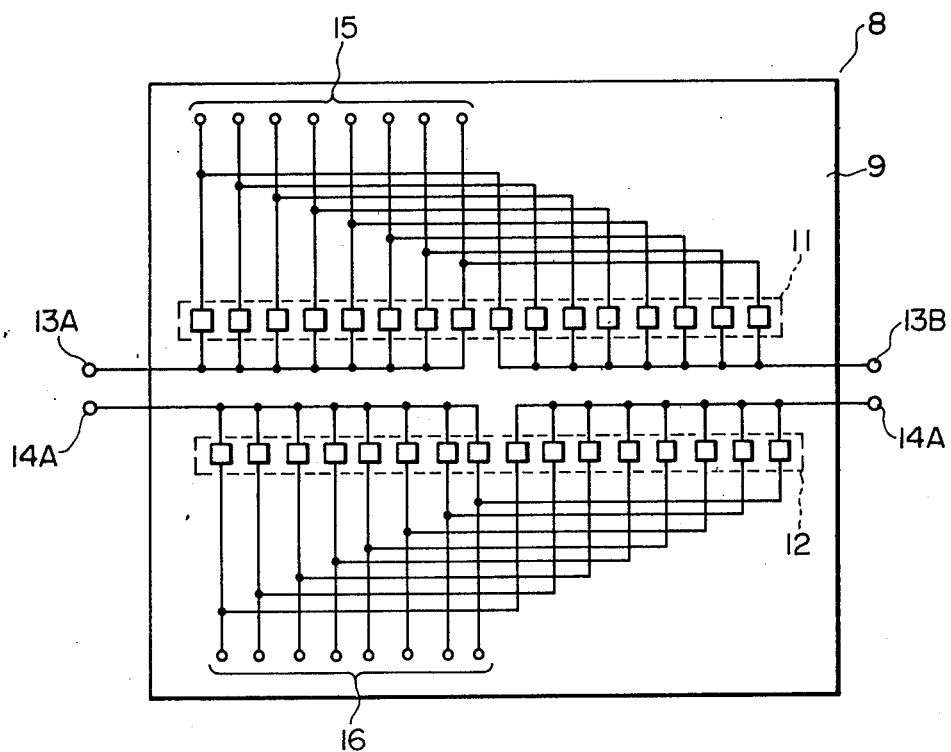
FIG. 2 is an explanatory diagram showing the arrangement of a high resolution thermal head.
Figure 3:
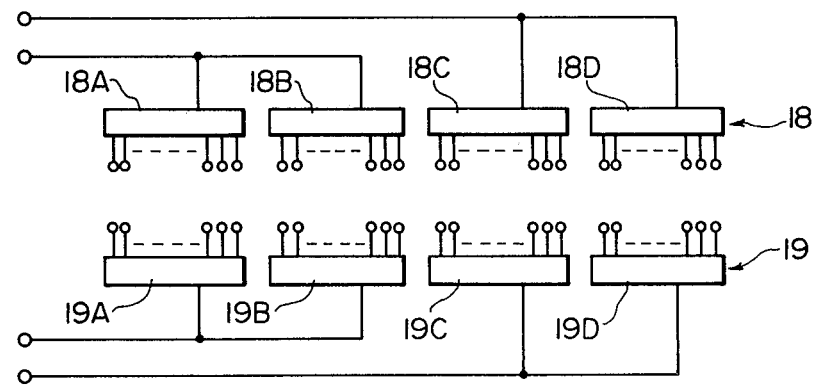
FIG. 3 is a theoretical diagram for describing the drive control of heat generating unit arrays in a thermal recording device according to one embodiment of this invention.

FIG. 3 outlines one example of a thermal recording device according to the invention. The device has two groups of heat generating unit arrays 18 and 19. The first group of heat generating unit arrays 18 is divided into four blocks 18A through 18D each comprising 400-bit heat generating units. The second group of heat generating unit arrays 19 is also divided into four blocks 19A through 19D each comprising 400-bit heat generating units. The thermal recording device includes a counter (not shown). The counter first counts the total number of heat generating elements which will simultaneously generate heat (or the total number of record bits) in the first set of blocks 18A and 18B in the first group of arrays, and in the first set of blocks 19A and 19B in the second group of arrays. In the case when the total number of record bits exceeds 400, the blocks 18A, 18B, 19A and 19B are driven successively so that the operations thereof are not overlapped. In the case when the total number of record bits is 400 or less, the blocks 18A, 18B, 19A and 19B are driven simultaneously. With respect to the remaining sets of blocks 18C, 18D, 19C and 19D in the two groups of heat generating unit arrays, the total number of record bits is likewise counted, and drive control is carried out similarly. Thus, the number of simultaneously recorded bits is set to 400 or less at all times, and accordingly the power source may be such that it has a power capacity suitable for recording 400 bits.

Figure 4:
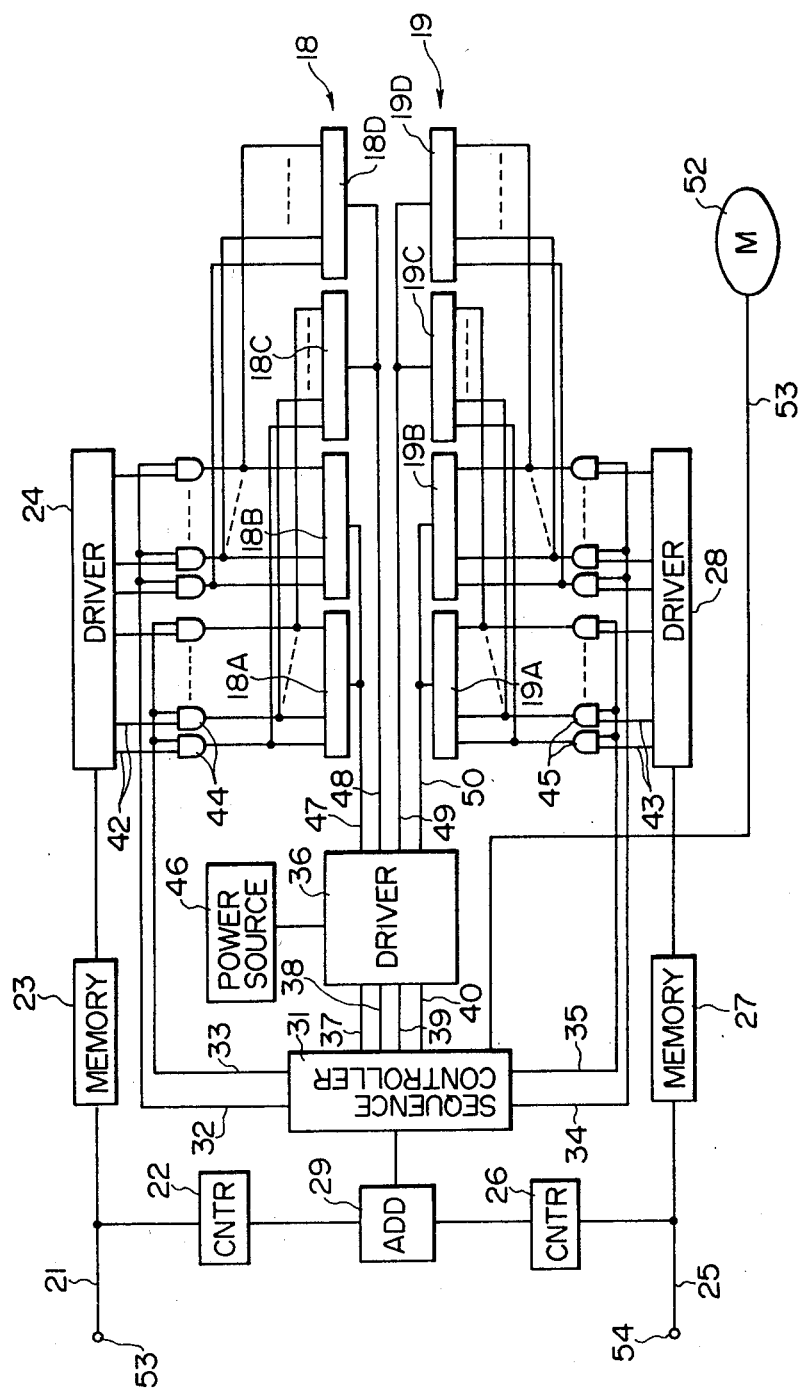
FIG. 4 is a circuit diagram showing the thermal recording device of FIG. 3 in more detail.

FIG. 4 shows the thermal recording device of the invention in more detail. A record signal 21 for driving the first group of heat generating unit arrays 18 is applied to a first counter 22 and a first memory 23. The record signal 21, after being stored temporarily in the first memory 23, is supplied to a first individual drive electrode driver 24. Similarly, a record signal 25 for driving the second group of heat generating unit arrays 19 is applied to a second counter 26 and a second memory 27, and then to a second individual drive electrode driver 28.

The count values of the first and second counters 22 and 26 are subjected to addition in an adder 29 every ½ line, and the result of this addition is applied to a sequence controller 31. According to the addition total, the sequence controller 31 determines the timing of the application of control signals to four individual drive electrode control lines 32 through 35 and the timing of the application of control signals to four common drive electrode control lines 37 through 40 which are connected to a common drive electrode driver 36.

Eight hundred lead wires 42 and eight hundred lead wires 43 are connected to the output terminals of the individual drive electrode drivers 24 and 28, respectively. The other ends of these lead wires are connected to first input terminals of two-input AND circuits 44 and 45. The individual drive electrode control lines 32 through 35 are commonly connected to the other input terminals of the AND circuits 44 and 45 separately according to the blocks. Output lines 47 through 50 for supplying heat generating electrical energy to eight blocks 18A through 18D and 19A through 19D in groups of two or four blocks are connected to the output of the common drive electrode driver 36, which receives electrical energy from the power source 46. The sequence controller 31 operates to supply a sheet feeding pulse signal 53 to a sheet feeding motor 52 whenever the recording for a line is accomplished by the heat generating unit arrays 18 and 19.

The operation of the thermal recording device thus arranged will now be described.

Record signals 21 and 25 for a line are supplied to a signal input terminal 53 for the first group and to a signal input terminal 54 for the second group, respectively. The adder 29 applies the result of the count of counters 22, 26 for the first half line to the sequence controller 31. The sequence controller 31 controls thermal recording of the first half line when the driving of the sheet feeding motor 52 is stopped. That is, in the case where the count value is 400 or less, the sequence controller 31 applies the control signals to the four individual drive electrode control lines 32 through 35, and drives the individual drive electrode drivers 24 and 28 with the aid of record signals supplied via the memories 23 and 27 to thereby cause the first half blocks 18A, 18B, 19A and 19B to perform thermal recording simultaneously. In the case where the count value is more than 400, the sequence controller 31 supplies control signals to the four individual drive electrode control lines 32 through 35 successively in such a manner that the application of the control signals are not overlapped in time, to drive the individual drive electrode drivers 24 and 28. Thus, the thermal recording operations carried out by the first half blocks 18A, 18B, 19A and 19B are performed one at a time. Similarly, a thermal recording operation for the second half line is carried out. When these recording operation have been achieved, the sequence controller 31 provides the sheet feeding signal 53 so that the heat-sensitive recording sheet (not shown) is moved in the auxiliary direction by one step.

As is apparent from the above description, according to the invention, the total number of record bits supplied to a plurality of thermal heads or heat generating unit arrays is obtained, to determine the number of blocks to be driven simultaneously, to thereby select a recording process speed. Therefore, in the invention, unlike in the prior art, it is unnecessary to make the recording process speeds of all the thermal heads or heat generating units equal.

Figure 5:
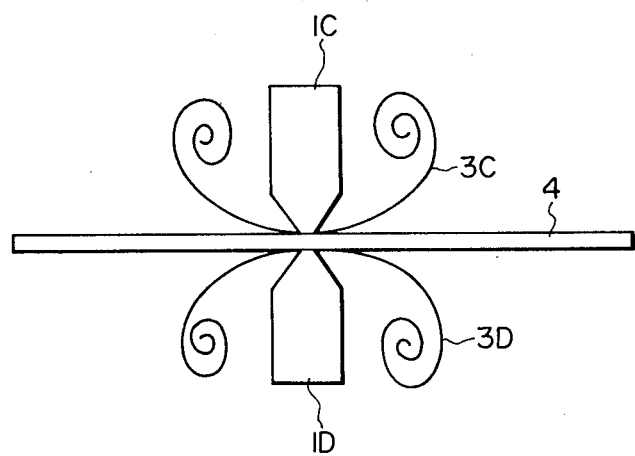
FIG. 5 is an explanatory diagram outlining a recording section of a dual-side recording device.

In the above-described embodiment, the number of bits forming each block is set at 400; however, the invention is not limited thereby or thereto. In addition, it will be understood that the technical concept of the invention is applicable to a multicolor (more than two color) recording device and to a thermal recording device of a dual-side recording system in which, as shown in FIG. 5, thermal heads IC and ID are disposed on both sides of a recording sheet 4, respectively, and data are recorded on both sides of the recording sheet 4 through ink donor sheets 3C and 3D, respectively.

What is claimed is:

1. A thermal recording device comprising:
    at least two thermal heads of heat generating unit arrays arranged in parallel with each other so that data are thermally recorded on a recording sheet, each of said thermal heads or heat generating unit arrays being divided into a plurality of blocks, each of said blocks comprising a predetermined number of heat generating units;
    a record signal counter means associated with each of said thermal heads or heating generating unit arrays for counting the number of recording signals for printing images supplied to said heads or arrays;
    means for adding the counts of said counters at preselected times to obtain the total count value contained in all of said counters; and
    drive control means responsive to the counts in said record signal counter means for determining a number of blocks to be simultaneously driven to perform recording without exceeding the capacity of a power source of said device.

2. A thermal recording device as claimed in claim 1 said addition being conducted every one-half line.

3. A thermal recording device comprising:
    at least two thermal heads or heat generating unit arrays arranged in parallel with each other so that data are thermally recorded on a recording sheet, each of said thermal heads or heat generating unit arrays being divided into a plurality of blocks, each of said blocks comprising a predetermined number of heat generating units;
    counting means for counting the number of recording signals for the printing out of images supplied to said thermal heads or heat generating unit arrays; and
    drive control means, responsive to the count in said counting means, for successively driving said blocks when the count value of said counting means exceeds said predetermined number, and for simultaneously driving said plurality of blocks when the count value of said counting means is less than said predeterined number.

4. A thermal recording device as claimed in claims 2 or 3, further comprising means for advancing a recording sheet, said means being controlled by said drive control means such that said sheet is advanced after the recording of one line is completed.

* * * * *